(12) United States Patent
Ichikawa et al.

(10) Patent No.: US 10,867,515 B2
(45) Date of Patent: *Dec. 15, 2020

(54) DRIVE ASSIST DEVICE

(71) Applicant: TOYOTA JIDOSHA KABUSHIKI KAISHA, Aichi-ken (JP)

(72) Inventors: Kentaro Ichikawa, Nagaizumi-cho (JP); Toshiki Kindo, Yokohama (JP); Katsuhiro Sakai, Hadano (JP); Masahiro Harada, Atsugi (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,698

(22) Filed: Nov. 9, 2018

(65) Prior Publication Data

US 2019/0080605 A1 Mar. 14, 2019

Related U.S. Application Data

(63) Continuation of application No. 14/418,514, filed as application No. PCT/JP2012/069608 on Aug. 1, 2012, now Pat. No. 10,163,348.

(51) Int. Cl.
| | |
|---|---|
| *G08G 1/16* | (2006.01) |
| *G08G 1/0962* | (2006.01) |
| *B60R 1/00* | (2006.01) |
| *G06K 9/00* | (2006.01) |
| *G06K 9/62* | (2006.01) |

(52) U.S. Cl.
CPC ............... *G08G 1/16* (2013.01); *B60R 1/00* (2013.01); *G06K 9/00825* (2013.01); *G06K 9/6253* (2013.01); *G08G 1/09623* (2013.01); *G08G 1/166* (2013.01); *B60R 2300/307* (2013.01); *B60R 2300/602* (2013.01)

(58) Field of Classification Search
CPC ...... G08G 1/16; G08G 1/166; G08G 1/09623; G06K 9/6253; G06K 9/00825; B60R 1/00; B60R 2300/307; B60R 2300/602
USPC ........................................................ 348/118
See application file for complete search history.

(56) References Cited

U.S. PATENT DOCUMENTS

| 6,556,917 B1 | 4/2003 | Wawra et al. |
|---|---|---|
| 6,587,593 B1 | 7/2003 | Matsuoka et al. |
| 2004/0042070 A1 | 3/2004 | Yagi et al. |
| 2004/0204157 A1 | 10/2004 | Remboski et al. |

(Continued)

FOREIGN PATENT DOCUMENTS

| CN | 101947956 A | 1/2011 |
|---|---|---|
| DE | 19941477 A1 | 3/2001 |

(Continued)

*Primary Examiner* — Marnie A Matt
(74) *Attorney, Agent, or Firm* — Sughrue Mion, PLLC

(57) ABSTRACT

A drive assist device includes a display that displays an image around a vehicle imaged by an imaging device installed on the vehicle, a setting unit that sets a target designated by a user on the image as a recognition target, a detection unit that detects a state change of the recognition target on the image in a case where the recognition target is set, and a notification control unit that controls a notification device to notify the user of the detection result in a case where the state change of the set recognition target is detected.

9 Claims, 10 Drawing Sheets

(56) References Cited

U.S. PATENT DOCUMENTS

| | | |
|---|---|---|
| 2005/0248445 A1 | 11/2005 | Matsuoka |
| 2006/0095192 A1 | 5/2006 | Uhler et al. |
| 2007/0217780 A1 | 9/2007 | Hirooka et al. |
| 2007/0222638 A1 | 9/2007 | Chen et al. |
| 2007/0276581 A1 | 11/2007 | Bae |
| 2007/0290875 A1 | 12/2007 | Pedrazzoli Pazos |
| 2008/0211779 A1* | 9/2008 | Pryor ................ G01C 21/3664 345/173 |
| 2008/0226126 A1 | 9/2008 | Ohno |
| 2008/0239078 A1 | 10/2008 | Mohr et al. |
| 2009/0174573 A1* | 7/2009 | Smith ................ G08G 1/0962 340/905 |
| 2009/0303077 A1 | 12/2009 | Onome et al. |
| 2010/0109908 A1 | 5/2010 | Miura |
| 2010/0141476 A1 | 6/2010 | Bauer et al. |
| 2010/0153844 A1 | 6/2010 | Hwang et al. |
| 2010/0253594 A1* | 10/2010 | Szczerba ................ G01S 13/723 345/7 |
| 2011/0010020 A1 | 1/2011 | Samukawa et al. |
| 2011/0050482 A1 | 3/2011 | Nanami |
| 2011/0115646 A1 | 5/2011 | Matsumura |
| 2011/0144908 A1 | 6/2011 | Cheong |
| 2011/0182475 A1* | 7/2011 | Fairfield ................ G01S 13/723 345/7 |
| 2012/0069180 A1 | 3/2012 | Kawamura et al. |
| 2013/0207805 A1 | 8/2013 | Inada |
| 2014/0161312 A1 | 6/2014 | Adachi |
| 2015/0375754 A1 | 12/2015 | Paek et al. |

FOREIGN PATENT DOCUMENTS

| | | |
|---|---|---|
| DE | 102011087459 A1 | 6/2013 |
| JP | 2010-173530 A | 8/2010 |
| JP | 2013-218571 A | 10/2013 |
| WO | 2009/101692 A1 | 8/2009 |

* cited by examiner

DRIVE ASSIST DEVICE

CROSS-REFERENCE TO RELATED APPLICATIONS

This is a continuation of U.S. patent application Ser. No. 14/418,514, filed Feb. 23, 2015 (allowed), which is a National Stage entry of International Application No. PCT/JP2012/069608, filed Aug. 1, 2012. The entire disclosures of the prior applications are considered part of the disclosure of the accompanying continuation application, and are hereby incorporated by reference.

BACKGROUND OF THE INVENTION

Field of the Invention

The present invention relates to a drive assist device.

Related Background Art

In International Publication No. WO2009/101692, for example, a forward monitoring device for monitoring a traffic light by a vehicle-mounted camera, and for notifying the user of a detection result in a case where green signal lighting is detected, is disclosed.

SUMMARY OF THE INVENTION

However, regardless of whether or not the user wants the monitoring of the traffic light, the device notifies the user of the fact that the green signal lighting is detected. Therefore, there has been a case where the user feels an uncomfortable feeling due to an unnecessary notification.

Therefore, the present invention provides a drive assist device that can suppress the uncomfortable feeling to the user due to the unnecessary notification.

A drive assist device in the present invention is configured to include: a display unit that displays an image around a vehicle imaged by an imaging device installed on the vehicle; a setting unit that sets a target designated by a user on the image as a recognition target; a detection unit that detects a state change of the recognition target on the image in a case where the recognition target is set; and a notification control unit that controls a notification device to notify the user of the detection result in a case where the state change of the set recognition target is detected.

In this way, since a detection result is given to the user in a case where the state change of the recognition target set by the user's designation is detected, if the user does not designate the recognition target, the notification is not performed. Therefore, the uncomfortable feeling to the user due to an unnecessary notification can be suppressed.

In addition, the recognition target may be a signal of a traffic light, and the detection unit may detect the state change of the traffic light from a stop signal to a go signal. In this way, appropriate notice can be given of the progressing enabled state of the host vehicle based on the state change of the signal of the traffic light.

In addition, the recognition target may be a preceding vehicle, and the detection unit may detect the state change of the preceding vehicle from a stopped state to a starting state. In this way, the progressing enabled state of the host vehicle can appropriately be notified based on the state change of the preceding vehicle. In addition, the notification can be performed in a case where the host vehicle is actually in a progressing enabled state.

In addition, the drive assist device may further include a conversion unit that converts a position on a first image suitable for visually checking the recognition target imaged by the imaging device to a position corresponding to a position on a second image suitable for detecting the state change of the recognition target imaged by another imaging device installed on the vehicle. The display unit may display the first image, the setting unit may set the target designated by the user on the first image as a recognition target on the second image, and in a case where the recognition target is set, the detection unit may detect the state change of the recognition target on the second image. In this case, it is possible to easily designate the recognition target and improve the detection accuracy in detecting the state change.

In addition, the drive assist device may further include a speed detection unit that detects a moving speed of the vehicle. In a case where the moving speed exceeds a threshold value, the display unit may not display the image. In this case, it is possible to suppress the power consumption required for the unnecessary image displaying. In addition, it is possible to suppress the hindrance to the driving operation caused by the unnecessary image displaying.

According to the present invention, it is possible to provide a drive assist device that can suppress the uncomfortable feeling to the user due to an unnecessary notification.

DESCRIPTION OF THE PREFERRED EMBODIMENTS

Hereinafter, the preferred embodiments of the present invention will be described in detail with reference to the drawings. In describing the drawings, the same reference signs will be given to the same or equivalent elements, and the description thereof will not be repeated.

First, the drive assist device 20 in the first embodiment of the present invention will be described with reference to FIG. 1 to FIG. 6. The drive assist device 20 is a device that performs a notification based on the state change of a recognition target such as a traffic light and the preceding vehicle.

Figure 1:
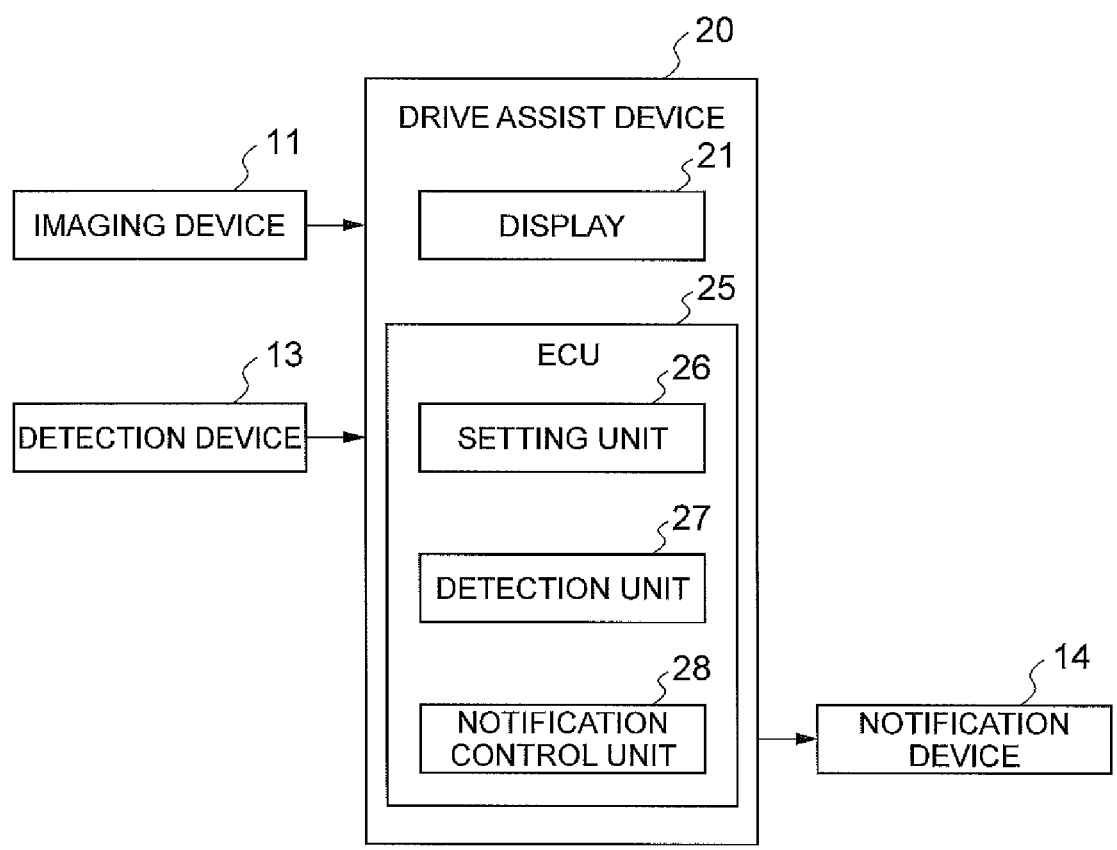
FIG. 1 is a block diagram illustrating a configuration of a drive assist device in a first embodiment of the present invention.

FIG. 1 is a block diagram illustrating a configuration of the drive assist device 20 in the first embodiment. The drive assist device 20, for example, is realized as one function of a navigation device mounted on the vehicle. An imaging device 11, a detection device 13, and a notification device 14, all of which are mounted on the vehicle, are connected to the drive assist device 20.

The imaging device 11 is a camera that images around the vehicle. The imaging device 11 images around the vehicle, particularly in front of the vehicle, and supplies the imaged image to the drive assist device 20. The image may be an image representing a situation which is normally captured by the user's visual observation, or may be a brightness image, an infrared image, or a spectrum image that represents a situation which is not normally captured. The imaging device 11 may be vehicle-mounted camera or may be a built-in camera in a mobile information terminal or the like.

The detection device 13 is a sensor that detects the moving state of the vehicle. A global positioning system (GPS) sensor, a wheel speed sensor, an acceleration sensor, and a steering angle sensor are used as the detection device 13.

The detection device 13 detects the moving state of the vehicle and supplies the detection result to the drive assist device 20. The detection device 13 functions as, for example, a speed detection unit that detects the vehicle speed.

The notification device 14 is a device that notifies the user of the state around the vehicle, particularly a state in front of the vehicle or state of the vehicle. A speaker, a light emitting diode (LED), a vibrator, and the like are used as the notification device 14. A display 21 described below may also be used. The notification device 14 performs the notification using any one of auditory information, visual information, and tactile information under the control of the drive assist device 20.

The drive assist device 20 includes the display 21 and an electronic control unit (ECU) 25. The display 21 functions as a display unit that displays the image in front of the vehicle imaged by the imaging device 11 installed on the vehicle. The display 21 displays the image supplied from the imaging device 11. It is preferable that the display 21 is controlled so as not display the image around the vehicle while the vehicle moves.

The ECU 25 includes a setting unit 26, a detection unit 27, and a notification control unit 28. The ECU 25 is mainly configured of a CPU, a ROM, and a RAM, and is operated by a program to realize the functions of the setting unit 26, the detection unit 27, and the notification control unit 28. The functions of the setting unit 26, the detection unit 27, and the notification control unit 28 may be realized by two or more ECUs.

The setting unit 26 sets a target designated by the user on the image as a recognition target. The setting unit 26 acquires position information of the target designated by the user on the image using an input device (not illustrated) such as a touch panel display. The setting unit 26 performs a pattern matching around the designated position on the image and specifies the recognition target, and supplies setting information of the specified recognition target to the detection unit 27. The setting information includes information of the range of the recognition target based on the position information and type of the recognition target.

The detection unit 27 detects the state change of the recognition target on the image in a case where the recognition target is set. The image is supplied to the detection unit 27 from the imaging device 11 and the setting information is supplied to the detection unit 27 from the setting unit 26. The detection unit 27 detects the state of the recognition target based on image information (for example, the brightness, the saturation, the shape, the size, or the like) of the specified recognition target on the image, and detects the state change of the recognition target based on the change of the image information. The detection unit 27 supplies the detection result of the state change to the notification control unit 28.

In a case where the state change of the set recognition target is detected, the notification control unit 28 controls the notification device 14 to notify the user of the detection result. The notification control unit 28 notifies, for example, of the progressing enabled state of the vehicle. For example, in a case where the state change of the traffic light from a stop signal to a go signal is detected or in a case where a state change of the preceding vehicle from the stopped state to the starting state is detected, the notification control unit 28 notifies the user of the detection result. The notification control unit 28 controls the operation of the notification device 14 by supplying the control signal according to the detection result of the state change to the notification device 14.

Figure 2:
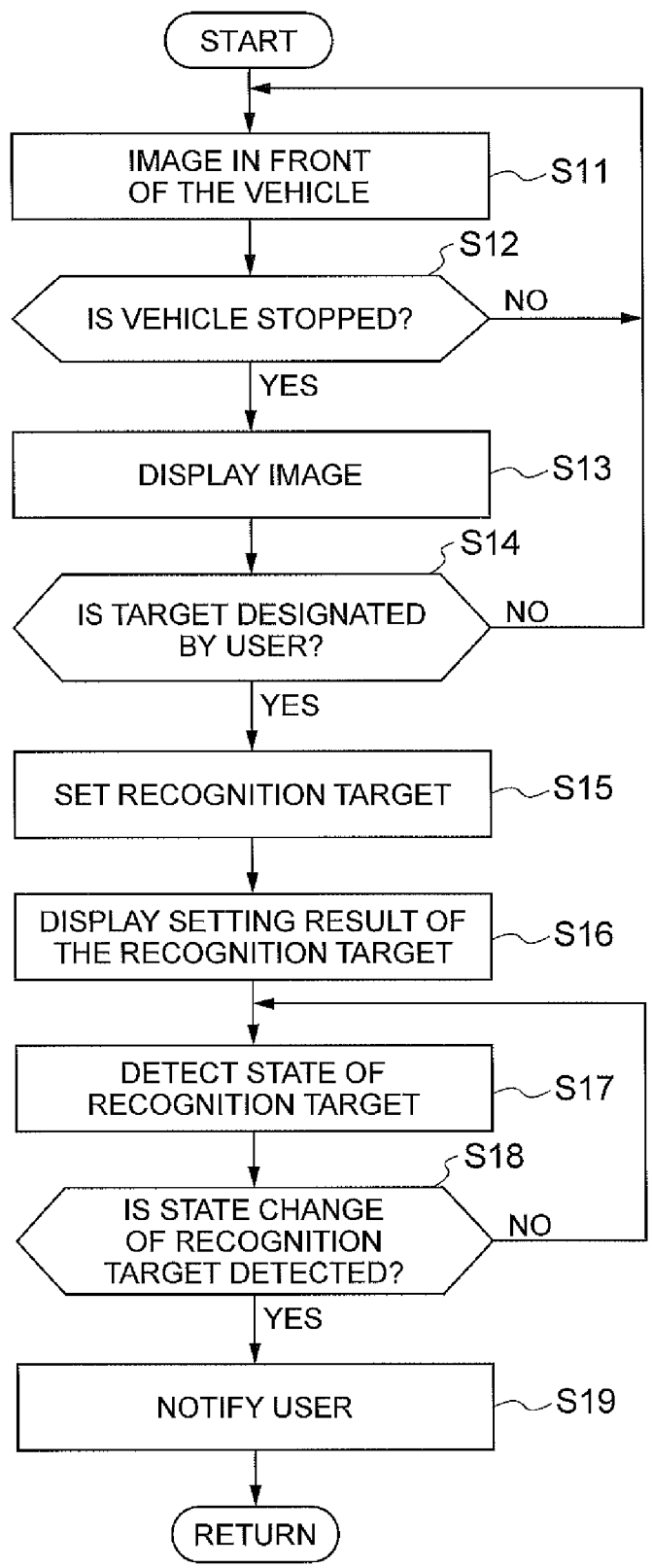
FIG. 2 is a flowchart illustrating an operation of the drive assist device.
Figure 3:
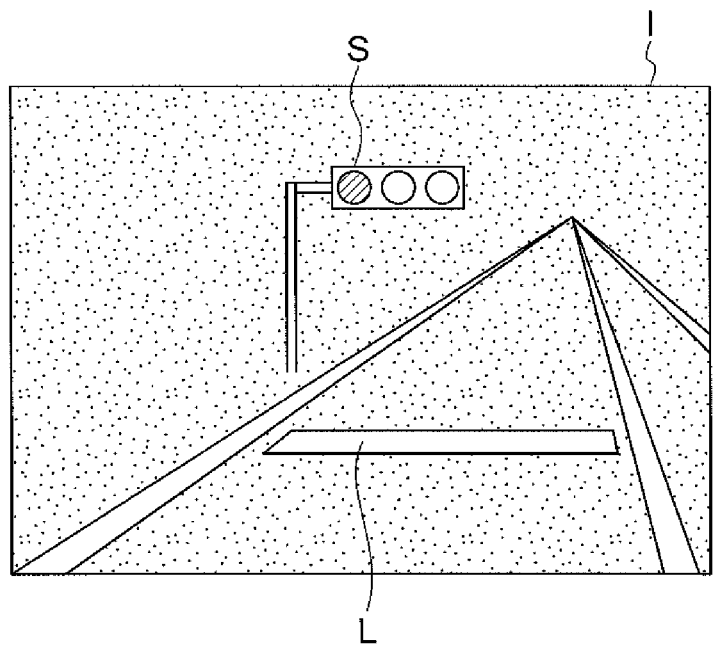
FIGS. 3(a) and 3(b) are diagrams explaining an operation of the drive assist device performing a notification based on a state change of the signal of the traffic light.
Figure 3:
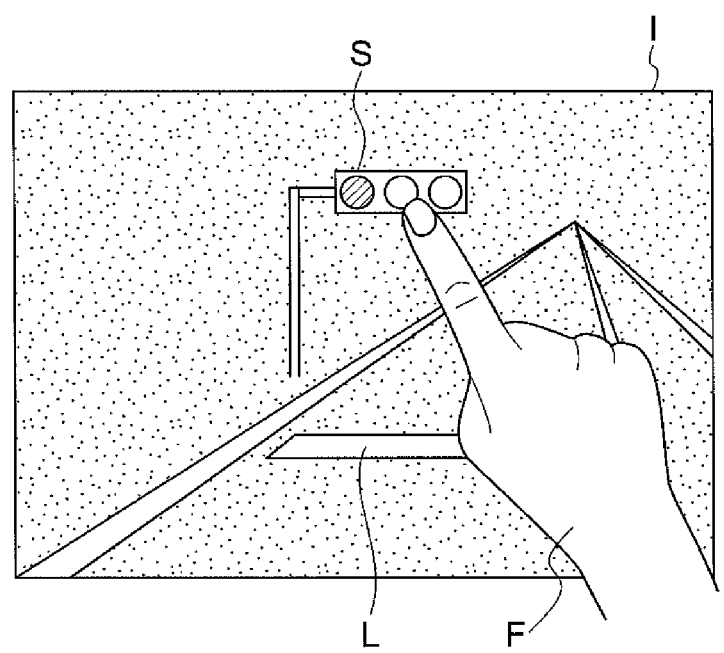
Figure 4:
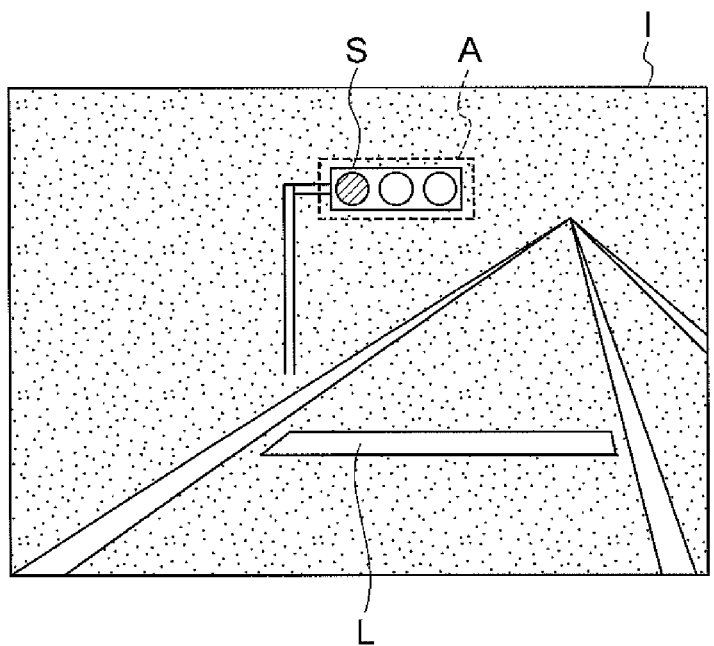
FIGS. 4(a) and 4(b) are diagrams explaining an operation of the drive assist device performing a notification based on the state change of the signal of the traffic light.
Figure 4:
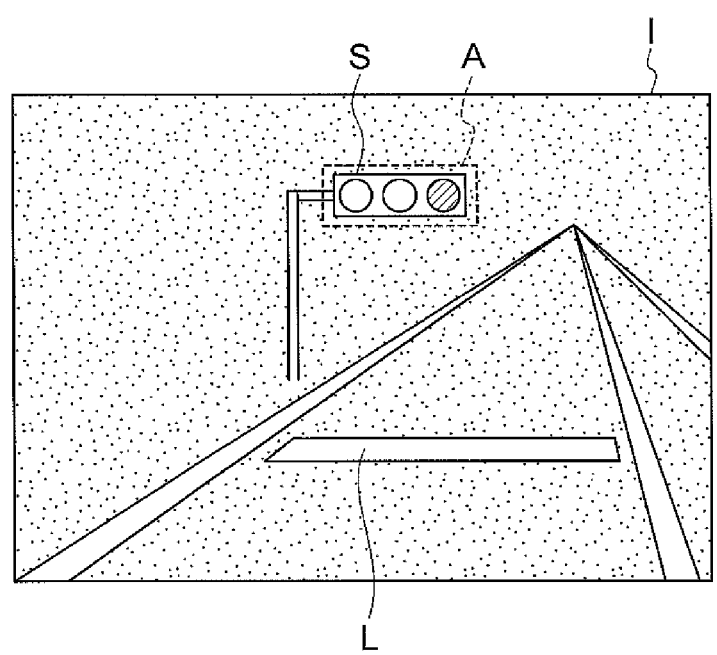

FIG. 2 is a flowchart illustrating an operation of the drive assist device 20. FIG. 3 to FIG. 6 are diagrams explaining the operation of the drive assist device 20. The drive assist device 20 repeatedly executes the processing tasks illustrated in FIG. 2 in a set cycle.

As illustrated in FIG. 2, the imaging device 11 images in front of the vehicle (STEP S11). The ECU 25 determines whether or not the vehicle is stopped, specifically whether or not the moving speed is lower than a threshold value (S12). Here, in a case where it is determined that the vehicle is stopped, the display 21 displays the image in front of the vehicle (S13). In contrast, in a case where it is not determined that the vehicle is stopped, the process returns to S11 without displaying the image.

When the image is displayed, the ECU 25 determines whether or not the user designates the target on the image (S14). Here, in a case where it is determined that the target is designated, the setting unit 26 sets the target designated by the user on the image as the recognition target (S15). Then, the display 21 displays the setting result of the recognition target by superimposing the setting result on the image (S16). Here, it is preferable that the setting of the recognition target is effective after the user confirms the setting result of the recognition target. On the other hand, in a case where it is not determined that the target is designated, the process returns to S11. Accordingly, if the user does not designate the target, subsequent processing such as the notification processing is not performed.

When the recognition target is set, the detection unit 27 detects the state of the recognition target based on the image information of the recognition target (S17). In addition, the detection unit 27 determines whether or not the state change of the recognition target is detected based on the image information of the recognition target (S18). In a case where it is determined that the state change is detected, the detection unit 27 supplies the detection result to the notification control unit 28, and the notification device 14 notifies the user of the detection result (S19). On the other hand, in a case where it is not determined that the state change is detected, the process returns to detect the state of the recognition target based on the image information of the recognition target (S17).

FIGS. 3(a), 3(b), 4(a) and 4(b) illustrate operation examples of the drive assist device 20 in a case where the progressing enabled state of the host vehicle is notified based on the state change of the traffic light S. In this example, the host vehicle stops in front of the stop line L for the signal waiting.

As illustrated in FIG. 3(a), an image I is displayed on the display 21, which indicates a traffic light S that is in a red signal lighting, that is, in a stop display state. As illustrated in FIG. 3(b), when the user designates the traffic light S by touching the region of traffic light S on the image I with a finger F, the traffic light S is set as the recognition target.

Then, as illustrated in FIG. 4(a), a setting frame A or the like that indicates the setting of the recognition target is displayed as superimposed on the traffic light S. It is preferable that the setting of the recognition target becomes effective by the user responding to the message or the like for requesting the confirmation of the setting result. In addition, the stop display state of the traffic light S is detected. Next, as illustrated in FIG. 4(b), when the sign of the traffic light S changes from the red signal to the green signal, the state change of the traffic light S from the stop display state to the progressing display state is detected. Then, for example, the progressing enabled state of the host vehicle is notified via a speaker.

In this way, in a case where the state change from the stop display state to the progressing enabled state of the traffic signal designated by the user is detected, the detection is notified to the user, but, if the user does not designate the traffic signal, the notification is not performed. Therefore, if the user does not want the notification based on the state change of the traffic signal and does not designate the traffic signal, the user does not feel an uncomfortable feeling due to an unnecessary notification.

Furthermore, by starting the state change detection processing of the traffic signal by the user's designation, the user does not need to monitor the traffic signal, and thus, a user's burden for monitoring can be reduced. In addition, by causing the user to designate the traffic signal, it is possible to reduce the processing resource required for the recognition of the traffic signal and to detect the state change of the traffic signal with high accuracy compared to the case of automatic recognition of the traffic signal.

FIGS. 5(a), 5(b), 6(a) and 6(b) illustrate an operation example of the drive assist device 20 in a case where the progressing enabled state of the host vehicle is notified based on the state change of the preceding vehicle V. In this example, the host vehicle is stopped behind the preceding vehicle V for congestion waiting.

Figure 5A:
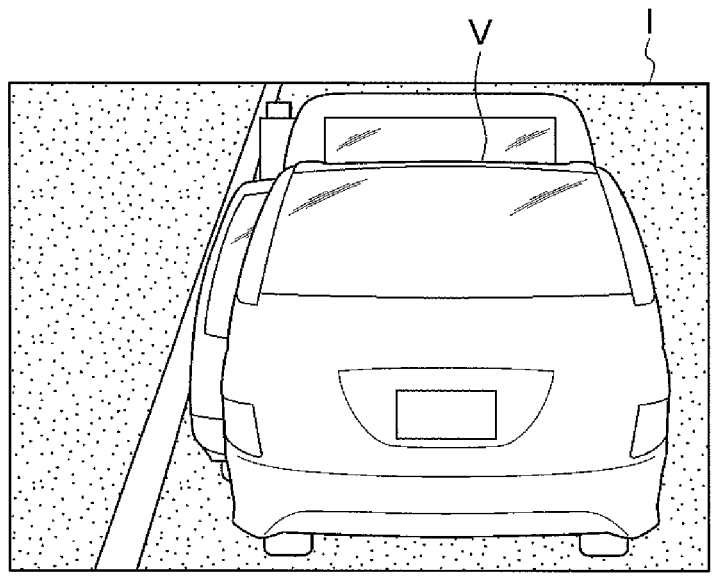
FIGS. 5(a) and 5(b) are diagrams explaining an operation of the drive assist device performing a notification based on a state change of a preceding vehicle.
Figure 5B:
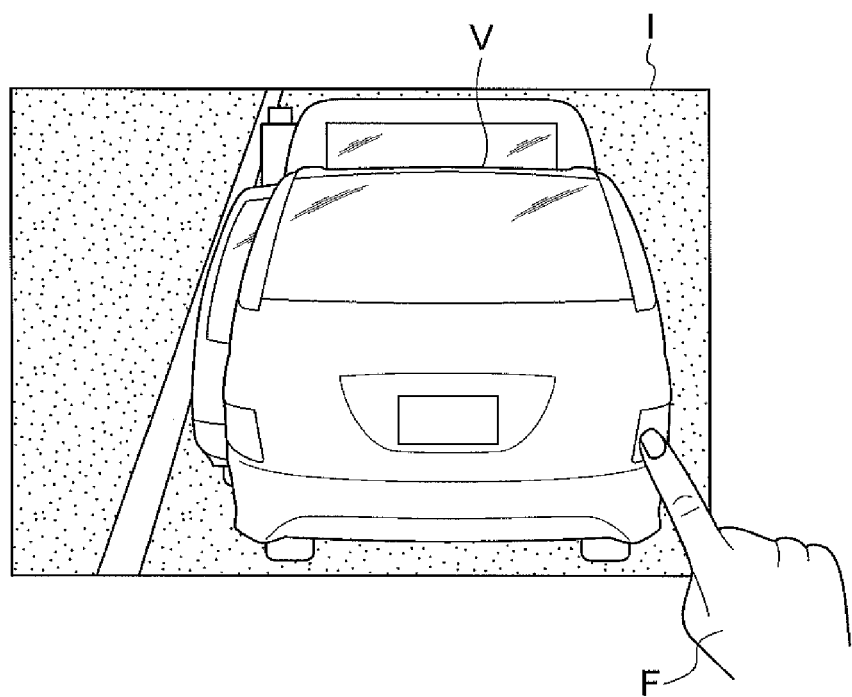
Figure 6:
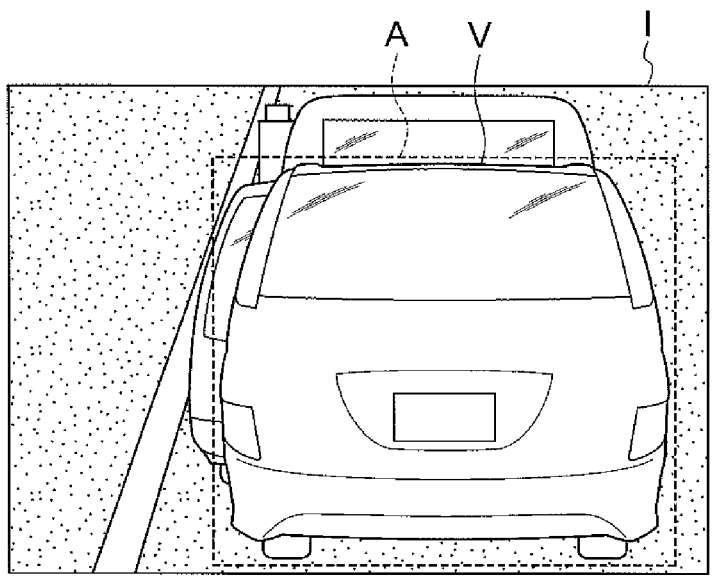
FIGS. 6(a) and 6(b) are diagrams explaining an operation of the drive assist device performing a notification based on a state change of a preceding vehicle.
Figure 6:
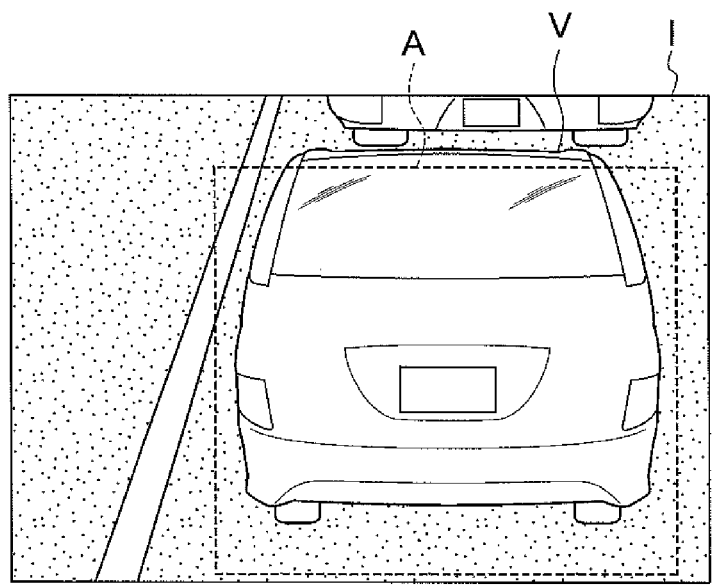

As illustrated in FIG. 5(a), an image I is displayed on the display 21, which indicates the preceding vehicle V in a stopped state. As illustrated in FIG. 5(b), when the user designates the preceding vehicle V by touching the preceding vehicle V on the image I with the finger F, the preceding vehicle V is set as the recognition target.

Then, as illustrated in FIG. 6(a), a setting frame A or the like that indicates the setting of the recognition target is displayed as superimposed on the preceding vehicle V. In addition, the preceding vehicle V in the stopped state is detected. Next, as illustrated in FIG. 6(b), when the preceding vehicle V starts, the state change of the preceding vehicle V from stopped state to the starting state is detected. Here, since the display region of the preceding vehicle V on the image I becomes small, the starting of the preceding vehicle V is detected. Then, for example, the progressing enabled state of the host vehicle is notified via a speaker.

In this way, in a case where the state change from the stopped state to the starting state of the preceding vehicle designated by the user is detected, the detection is notified to the user. However, if the user does not designate the preceding vehicle, the notification is not performed. Therefore, if the user does not want the notification based on the state change of the preceding vehicle and does not designate the preceding vehicle, the user does not feel an uncomfortable feeling due to an unnecessary notification. In addition, the notification can be performed in a case where the host vehicle is actually in a progressing enabled state.

Both of the traffic light and the preceding vehicle may be the recognition target. In this case, in a situation of traffic sign waiting or the like, the notification may be performed based on the state change of the traffic signal in a case where the traffic signal can be recognized, and the notification may be performed based on the state change of the preceding vehicle in a case where the traffic signal cannot be recognized. In addition, in a case where the preceding vehicle is designated as the recognition target, a part of the preceding vehicle such as a license plate in which the accuracy of the detection can be ensured may be designated as the recognition target.

Next, a drive assist device 30 in a second embodiment of the present invention will be described with respect to FIG. 7 to FIG. 10. The second embodiment is different from the first embodiment in a point that an image suitable for visually checking the recognition target and an image suitable for detecting the state change of the recognition target are used. Hereinafter, the description that is the same as that in the first embodiment will not be repeated.

Figure 7:
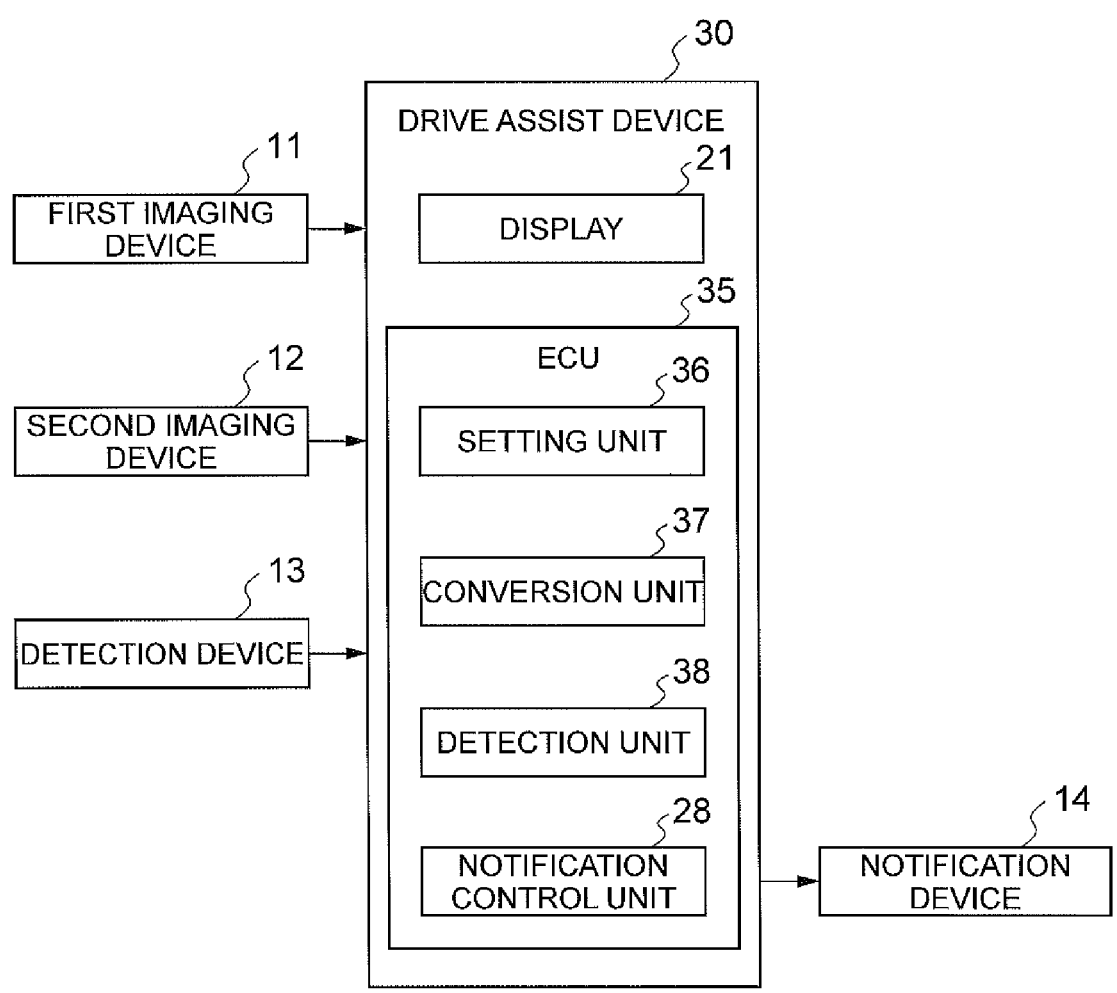
FIG. 7 is a block diagram illustrating a configuration of the drive assist device in a second embodiment of the present invention.

FIG. 7 is a block diagram illustrating a configuration of the drive assist device 30 in the second embodiment. A first imaging device (an imaging device) 11, a second imaging device 12 (another imaging device), the detection device 13, and the notification device 14 are connected to the drive assist device 30, and all of those are installed on the vehicles. The functions of the detection device 13 and the notification device 14 are similar to those in the first embodiment.

The first imaging device 11 images around the vehicle, particularly in front of the vehicle, as the first image suitable for visually checking the recognition target, and supplies the imaged first image to the drive assist device 30. The first image is an image representing a situation that is normally captured by the user's eyes.

The second imaging device 12 images around the vehicle, particularly in front of the vehicle, as the second image suitable for detecting the state change of the recognition target, and supplies the imaged second image to the drive assist device 30. The second image is a brightness image, an infrared image, a spectrum image, or the like representing situations that are not normally captured by the user's eyes. At least parts of the imaging ranges of the first imaging device 11 and the second imaging device 12 overlap.

The drive assist device 30 includes a display 21 and an ECU 35. The display 21 displays the first image that is suitable for visual checking of the recognition target.

The ECU 35 includes a setting unit 36, a conversion unit 37, a detection unit 38, and the notification control unit 28. The function of the notification control unit 28 is similar to that in the first embodiment.

The setting unit 36 sets a target on the first image designated by the user as the recognition target. The setting unit 36 acquires position information of the target designated by the user on the first image. The setting unit 36 performs a pattern matching around the position on the second image corresponding to the designated position on the first image and specifies the recognition target based on the position information, and supplies setting information of the specified recognition target to the detection unit 37.

The conversion unit 37 converts the position on the first image to the position on the second image. The conversion unit 37 converts the position considering the installation situations and the imaging conditions of the first imaging device 11 and the second imaging device 12. The conversion unit 37 converts the position information of the designated target on the first image to the corresponding position information on the second image.

The detection unit 38, in a case where the recognition target is set, detects the state change of the recognition target on the second image. The detection unit 38 performs the detection using the second image suitable for detecting the state change of the recognition target. The second image is supplied from the second imaging device 12, and the converted position information is supplied from the conversion unit 37 to the detection unit 38. The detection unit 38 detects the state of the recognition target based on the image information (for example, the brightness, the saturation, the shape, the size, or the like) of the designated recognition target on the second image, and detects the fact that the state change of the recognition target occurred based on the change of the image information. The detection unit 38 supplies the detection result of the state change to the notification control unit 28.

Figure 8:
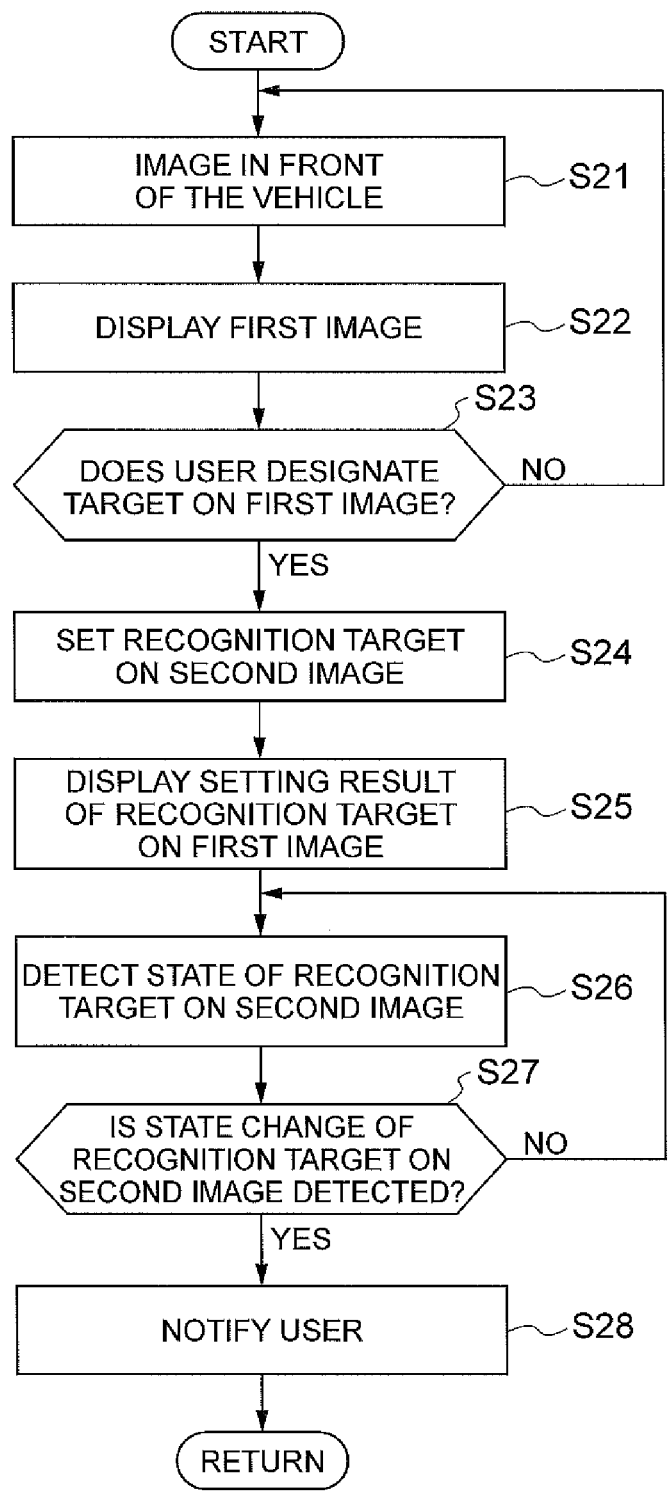
FIG. 8 is a flowchart illustrating an operation of the drive assist device.

FIG. 8 is a flowchart illustrating an operation of the drive assist device 30. FIG. 9 and FIG. 10 are diagrams explaining the operation of the drive assist device 30. The drive assist device 30 repeatedly executes the processing tasks illustrated in FIG. 8 in the set period.

As illustrated in FIG. 8, the first imaging device 11 and the second imaging device 12 image are in front of the vehicle (S21). The display 21 displays the first image of the front of the vehicle (S22).

When the first image is displayed, the ECU 35 determines whether or not the user designates the target on the first image (S23). Here, in a case where it is determined that the target is designated, the setting unit 36 sets the recognition target on the second image (S24). Then, the display 21 displays the setting result of the recognition target by superimposing on the first image (S25). On the other hand, in a case where it is not determined that the target is designated, the process returns to S21. Accordingly, if the user does not designate the target, subsequent processing such as the notification processing is not performed.

When the recognition target is set, the detection unit 38 detects the state of the recognition target based on the image information of the recognition target on the second image (S26). In addition, the detection unit 38 determines whether or not the state change of the recognition target is detected based on the image information of the recognition target on the second image (S27). In a case where it is determined that the state change is detected, the detection unit 38 supplies the detection result to the notification control unit 28, and the notification device 14 notifies the user of the detection result (S28). On the other hand, in a case where it is not determined that the state change is detected, the process returns to S26.

FIG. 9 and FIG. 10 illustrate operation examples of the drive assist device 30 in a case where the progressing enabled state of the host vehicle is notified based on the state change of the preceding vehicle V. In this example, the host vehicle is stopped behind the preceding vehicle V for the congestion waiting.

Figure 9A:
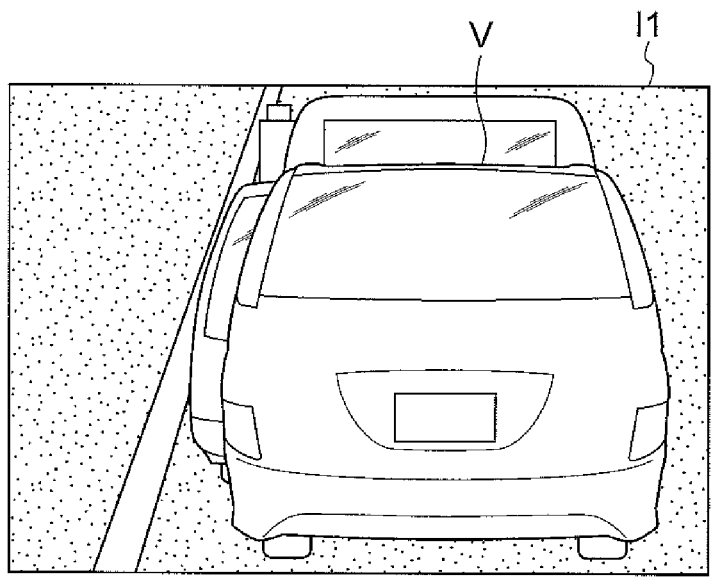
FIGS. 9(a) and 9(b) are diagrams explaining an operation of the drive assist device performing a notification based on a state change of a preceding vehicle.
Figure 9B:
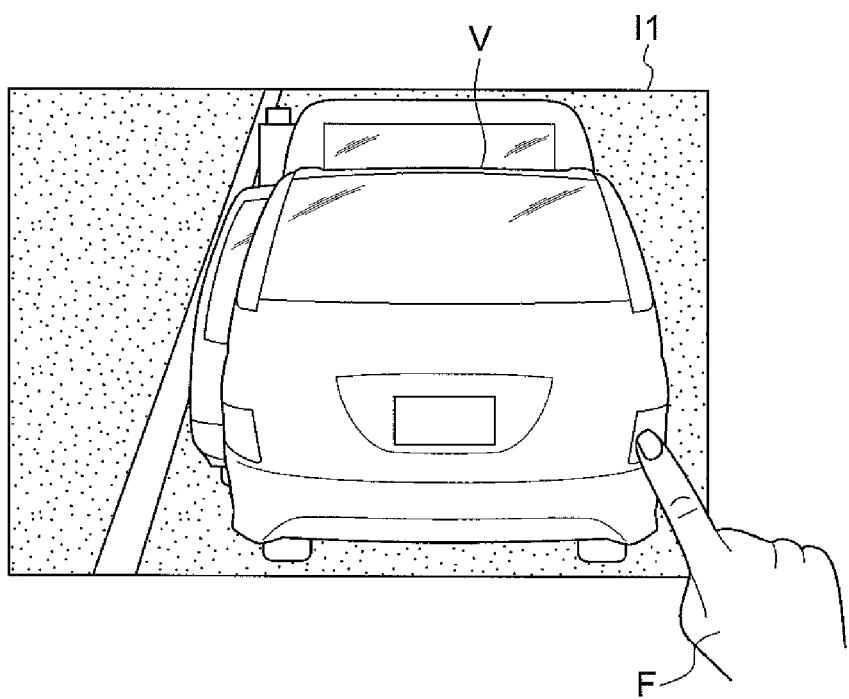
Figure 10:
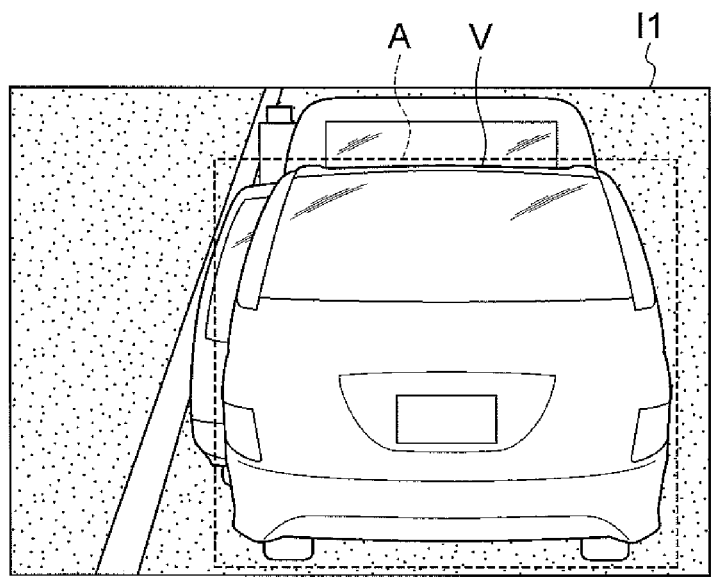
FIGS. 10(a) and 10(b) are diagrams explaining an operation of the drive assist device performing a notification based on a state change of a preceding vehicle.
Figure 10:
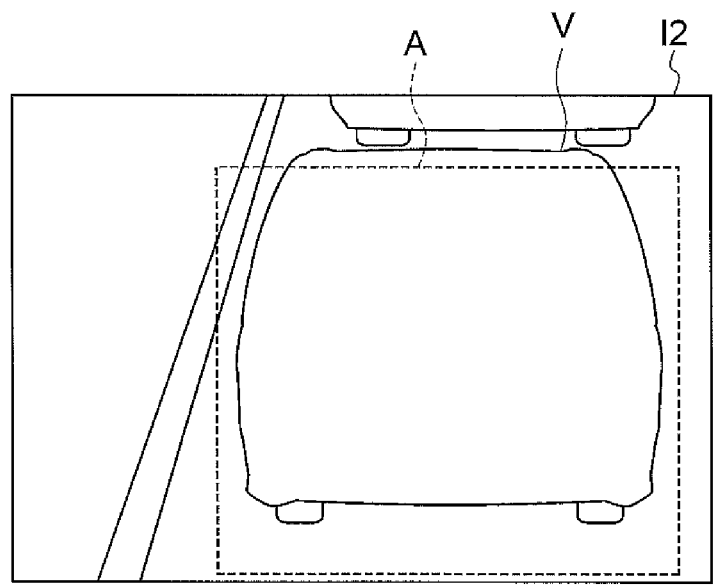

As illustrated in FIG. 9(a), a first image I1 which indicates the preceding vehicle V in the stopped state is displayed on the display 21. As illustrated in FIG. 9(b), when the user designates the preceding vehicle V by touching the preceding vehicle V on the first image I1 with the finger F, the preceding vehicle V is set as the recognition target. Here, in designating the preceding vehicle V, since the first image I1 suitable for visual checking is used, the preceding vehicle V can easily be designated.

Then, as illustrated in FIG. 10(a), a setting frame A or the like that indicates the setting of the recognition target on the first image I1 is displayed as superimposed on the preceding vehicle V. In addition, the preceding vehicle V in the stopped state is detected. Next, as illustrated in FIG. 10(b), when the preceding vehicle V starts, the state change of the preceding vehicle V from the stopped state to the starting state on the second image I2 is detected. The second image I2 is not displayed on the display 21. Here, in detecting the state change of the preceding vehicle V, since the second image I2 suitable for detecting the state change such as the brightness image or the like is used, it is possible to detect the state change of the preceding vehicle V with high accuracy. Then, the progressing enabled state of the host vehicle can be notified via, for example, the speaker.

In this way, it is possible to easily designate the recognition target and improve the detection accuracy in detecting the state change. In the above description, a case of detecting the state change of the preceding vehicle using the second image is described. However, the state change of the traffic light S may be detected.

As described above, according to the drive assist devices 20 and 30, since the detection result is notified to the user in a case where the state change of the recognition target set by the user's designation is detected, if the user does not designate the recognition target, the notification is not performed. Therefore, it is possible to suppress the uncomfortable feeling to the user due to the unnecessary notification.

In addition, by performing the notification in a case where the state change of the traffic signal from the stop display to the progressing display is detected, the progressing enabled state of the host vehicle can appropriately be notified based on the state change of the traffic signal.

In addition, by performing the notification in a case where the state change of the preceding vehicle from the stopped state to the starting state is detected, the progressing enabled state of the host vehicle can appropriately be notified based on the state change of the preceding vehicle. In addition, the notification can be performed in a case where the host vehicle is actually in a progressing enabled state.

In addition, by using the image suitable for visually checking the recognition target and the image suitable for detecting the state change of the recognition target, it is possible to easily designate the recognition target and improve the detection accuracy in detecting the state change.

In addition, by not displaying the image in a case where the moving speed of the vehicle exceeds the threshold value, it is possible to suppress the power consumption required for the unnecessary image displaying. In addition, it is possible to suppress the hindrance to the driving operation caused by the unnecessary image displaying.

The embodiment described above is the best embodiment of the drive assist devices 20 and 30 according to the present invention, and the drive assist devices 20 and 30 are not limited the above-described embodiments. The drive assist devices 20 and 30 according to the present invention may be modified without departing from the scope of the invention described in the Claims, or may be the devices applied to other devices.

For example, in the embodiment described above, the progressing enabled state of the host vehicle is notified with at least one of the traffic light and the preceding vehicle as the recognition target. However, the progressing enabled state of the host vehicle may be notified with another object as the recognition target. In addition, other states such as a parking enabled state or a retreating enabled state of the host vehicle may be notified, instead of the progressing enabled state of the host vehicle.

In addition, as a detection device, the most suitable device may be selected according to the recognition target. For example, if the recognition target is limited to a vehicle, by using a display that displays computer graphics together with using the radar as a detection device, the similar effect can be obtained. Alternatively, a laser scanner capable of three-dimensional measuring may be used as a detection device.

In addition, if the recognition target is limited to a vehicle, the recognition target may be set by acquiring a voice that reads a number on a license plate by the voice recognition device.

What is claimed is:

1. A drive assist device for a vehicle comprising:
a camera configured to capture an environment around the vehicle;
a display configured to display the captured environment;
a target setter configured to determine whether a user has designated a target region of the captured environment on the display, and when the target region is designated by the user, recognize an object on the target region that is capable of a state change, as a corresponding target object;
a detector configured to detect whether a state change has occurred of the recognized corresponding target object on the display without detecting whether a state change has occurred of other objects that are not recognized corresponding target object on the display, wherein the detector detects whether the state change has occurred based on a change of image information; and
a notification controller configured to control a notification to the user when the state change of the recognized corresponding target object is detected.

2. The drive assist device according to claim 1,
wherein the target region is a traffic light, and the recognized corresponding target object of the target region is a signal of the traffic light, wherein the state change of the signal is when a stop signal changes to a go signal, and
wherein the detector detects the state change of the traffic light when the signal changes from the stop signal to the go signal.

3. The drive assist device according to claim 1,
wherein the recognized corresponding target object is a preceding vehicle, wherein the state change of the preceding vehicle is when the preceding vehicle changes from a stopped state to a starting state, and
wherein the detector detects the state change of the preceding vehicle when the preceding vehicle changes from the stopped state to the starting state.

4. The drive assist device according to claim 1, further comprising:
a conversion unit that converts a position on a first image suitable for visually checking the recognized corresponding target object imaged by the camera to a position corresponding to a position on a second image suitable for detecting the state change of the recognized corresponding target object imaged by another camera installed on the vehicle,
wherein the display displays the first image,
wherein the target setter sets the target region by the user on the first image as a recognized corresponding target object on the second image, and
wherein, in a case where the recognized corresponding target object is set, the detector detects the state change of the recognized corresponding target object on the second image.

5. The drive assist device according to claim 1, further comprising:
a speed detection unit that detects a moving speed of the vehicle,
wherein, in a case where the moving speed exceeds a threshold value, the display does not display the captured environment.

6. The drive assist device according to claim 1, wherein the target setter enables the setting of the recognized corresponding target object after the user confirms a setting result of the recognized corresponding target object.

7. The drive assist device according to claim 1, wherein the target setter enables the setting of the recognized corresponding target object after the user responds to a message for requesting confirmation of a setting result.

8. A drive assist device for a vehicle comprising:
a camera configured to capture an environment around the vehicle;
a display configured to display the captured environment; and
an electronic control unit programmed to:
set a target region on the display when the target region is designated by a user;
recognize an object that is capable of changing state on the target region as a corresponding target object;
detect a change in a state of only the recognized corresponding target object without detecting a change in a state of other targets that are not recognized corresponding target objects, wherein the detector detects whether the state change has occurred based on a change of image information; and
notify the user, using visual, auditory or tactual information, of the detected change in the state of the recognized corresponding target object.

9. The drive assist device according to claim 1, wherein the recognized corresponding target object is one of a plurality of objects from which the user selects on the display of the captured environment around the vehicle when the vehicle is stopped, so that the change of state for only the recognized corresponding target object from amongst the plurality of objects is detected for notification to the user.

* * * * *